Feb. 2, 1954 W. K. SETTLEMIRE 2,667,710
COUPLING ATTACHMENT FOR TRACTOR DRAWN PLOW
Filed Jan. 11, 1952 2 Sheets-Sheet 1

INVENTOR
Warren K. Settlemire
BY Mason, Fenwick & Lawrence
ATTORNEYS

Feb. 2, 1954      W. K. SETTLEMIRE      2,667,710
COUPLING ATTACHMENT FOR TRACTOR DRAWN PLOW
Filed Jan. 11, 1952      2 Sheets-Sheet 2

INVENTOR
Warren K. Settlemire

BY Mason, Fenwick & Lawrence
ATTORNEYS

Patented Feb. 2, 1954

2,667,710

UNITED STATES PATENT OFFICE 2,667,710

COUPLING ATTACHMENT FOR TRACTOR DRAWN PLOW

Warren K. Settlemire, Port Saint Joe, Fla.

Application January 11, 1952, Serial No. 265,929

4 Claims. (Cl. 37—98)

1

This invention relates to a coupling attachment especially designed to be used to connect a fire plow to a tractor, but it is within the purview of the invention to employ the coupling attachment in any relationship to which it is adapted.

In certain parts of our country, particularly the flat pine lands of the South, protection against fire devastation of the forests is obtained by the provision at intervals of fire stops in the form of wide ditches which interrupt the inflammable floor of the forest. In localities where the water table is close to the surface, these ditches also serve for drainage purposes.

The plow for making the ditch is a ponderous implement of the shovel type, the aggregate spread of the mold boards being as much as four and a half feet, for example, the plow working at a depth of the order of eighteen to twenty inches. The earth turned out by the mold boards ordinarily increases the width of the ditch considerably beyond the width of the plow. Relatively great power is obviously required for operating this plow, so that the tractor employed will in general be of the crawler type, the one shown by way of illustration having a transverse bar plate at the rear, with a clevis vertically pivoted on the drawbar plate.

Due to the weight of the plow, the practical manner of lifting it is by a cable operated by a power winch carried by the tractor, and the tractor shown in the drawing is equipped with such a winch. It will be understood that the tractor and winch are no part of the present invention.

It will also be readily understood that the coupling attachment for any tractor drawn plow must include a vertical pivot to permit the plow to follow curves, and a horizontal pivot to provide for lifting of the plow, but in a shovel plow of the size contemplated, special provision must be made to prevent yawing of the plow which is caused by lateral movement of the vertical pivot, and means must also be provided to hold the vertical pivot firmly vertical against forces tending to tilt one or the other of the wide mold boards of the plow, so that the plow will ride on an even keel.

One of the objects of the invention is to provide a coupling attachment between a tractor and fire plow or like implement, which shall suppress the lateral swing of the drawbar about its pivotal axis with respect to the drawbar plate, and which shall firmly hold the vertical pivot of the plow against deviation from vertically,

2 under forces acting against the mold boards tending to tilt the plow laterally.

Another object of the invention is to provide a coupling attachment between a tractor of the type which has a transverse drawbar and a conventional bifurcated clevis pivoted thereto on a vertical axis with the clevis coupling pin vertical, and a fire plow having spaced longitudinal beams and characterized by a broad shovel which, due to the leverage incident to its width, makes the plow inherently unduly tiltable transversely under unequal stresses against the opposite sides of the shovel, the attachment including means for immobilizing the swing of the clevis and a coupling element having a vertical forward portion embracing said coupling pin in zones within and above said clevis, and a horizontal rearward portion journaled at its ends in the spaced plow beams.

Other objects of the invention will appear as the following description of a practical embodiment thereof appears.

In the drawings which accompany and form a part of the following specification and throughout the several figures of which the same characters have been used to denote identical parts:

Figure 1 is a side elevation showing the rear portion of a winch equipped tractor, a fire plow in working position, and a coupling attachment which embodies the concept of the present invention;

Figure 2:
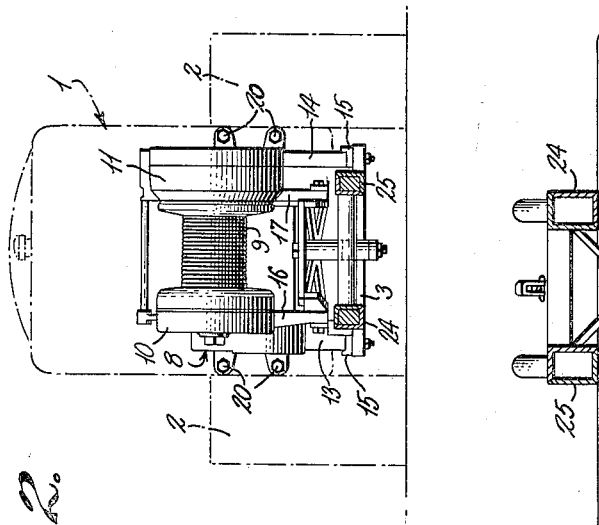
Figure 2 is a view partly in section, taken along the line 2—2 of Figure 1.
Figure 3:
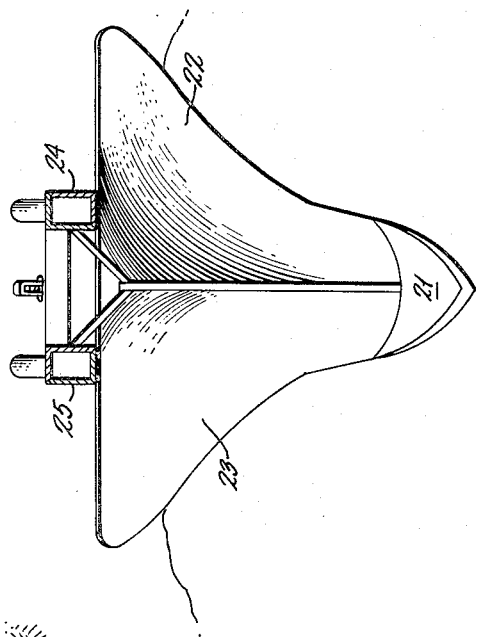
Figure 3 is a sectional view taken along the line 3—3 of Figure 1.
Figure 4:
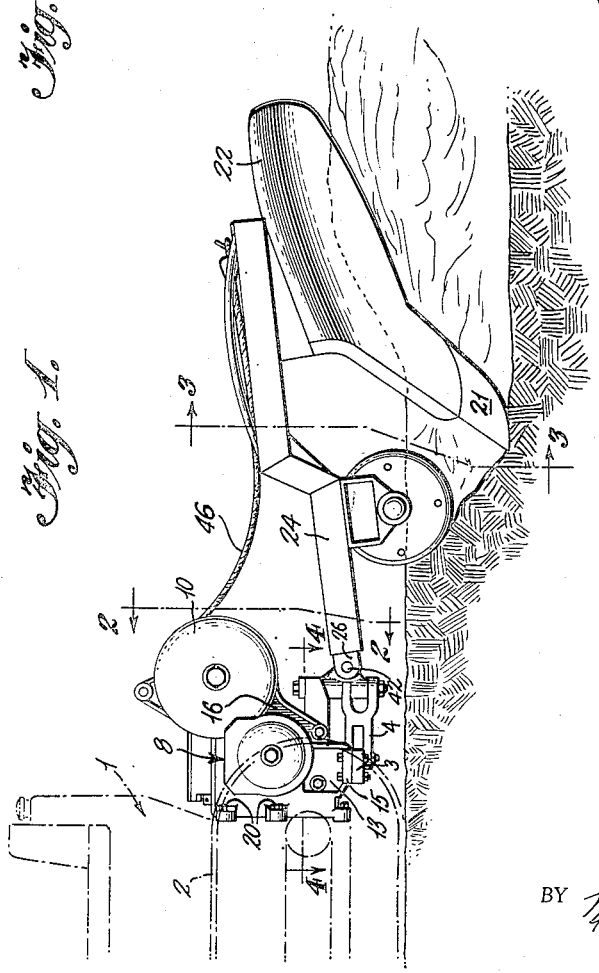
Figure 4 is a sectional view taken along the line 4—4 of Figure 1.
Figure 4:
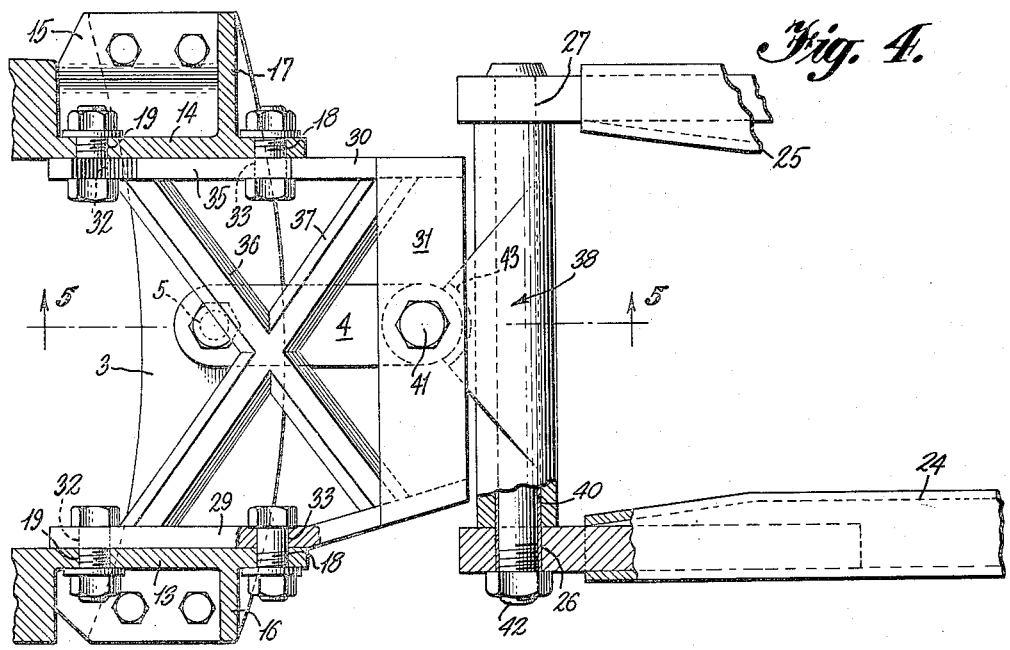
Figure 5:
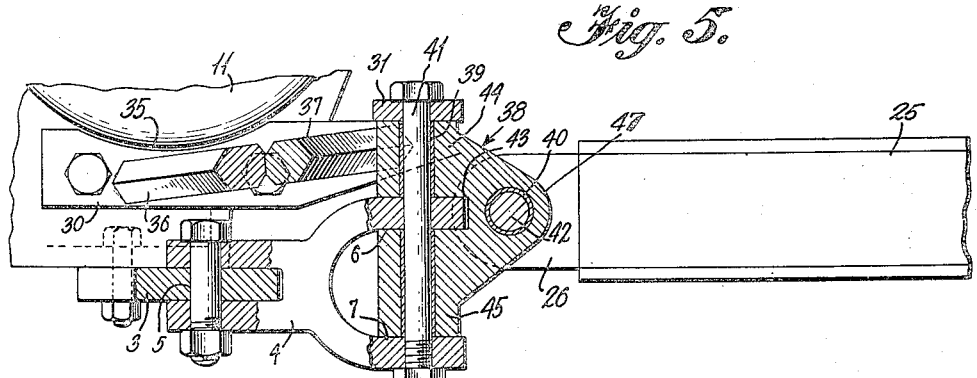
Figure 5 is a vertical section taken along the line 5—5 of Figure 4.
Figure 6:
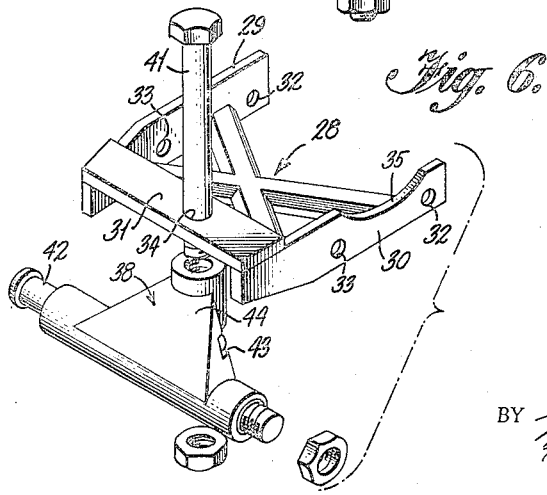
Figure 6 is an exploded view in perspective of the coupling attachment, and including the pivot pins.

Referring now in detail to the drawings, the numeral 1 represents a tractor which is shown somewhat diagrammatically and is of the crawler type, as indicated by the tread 2. It has a tractor frame supported transverse drawbar plate 3, which is conventional in tractors of this type, said plate having a series of holes into any one of which the drawbar clevis 4 may be selectively bolted, but for the purpose of the present invention the middle hole 5 is utilized, since in the type of plow employed the draft is uniform on both sides. The outer end of the clevis is bifurcated in usual manner to provide the upper and lower eyes 6 and 7, the holes through which are in vertical alignment.

The winch 8 includes the cable drum 9 and a casing that includes gear housings 10 and 11 at the opposite ends of said drum. The housing 11 is wider than the housing 10, since it contains the reduction gearing, so that the drum is not positioned transversely symmetrical with respect to the medial longitudinal vertical plane of the tractor. The sides of the casing are formed with integral standards 13 and 14 having out turned bases 15, which rest upon the drawbar plate 3 at the ends of the latter, and are bolted thereto. Said standards include integral forwardly extending bracket portions 16 and 17, which support the respective gear housings. The bracket portion 17 beneath the wider gear housing 11 is closer to the medial longitudinal vertical plane of the tractor than the bracket portion 16. The standards, including said bracket portions, are provided with a pair of spaced horizontally disposed bolt holes 18 and 19 for the attachment of auxiliary devices for various purposes which the manufacturer of the winch makes available. The back of the winch casing is bolted to the transmission case of the tractor by bolts 20.

The plow comprises the point 21, similar mold boards 22 and 23, and a pair of longitudinally spaced parallel beams 24 and 25. Said beams are connected to the top of the mold boards 22 and 23, respectively, at the outer ends, and terminate in eyes 26 and 27, respectively, at their inner ends. The plow is connected by a cable 46 to the winch drum for purpose of lifting the plow when required, by power derived from the tractor.

The tractor, winch and plow are not part of the present invention, but constitute the structural environment in which the coupling attachment of the present invention functions.

Said coupling attachment comprises a frame 28, having side members 29 and 30 and a cross member 31 on top of said side members at their outer ends and fixed at its ends thereto. The side members have the maximum depth dimension that will permit them to be mounted in the space between the winch casing and the drawbar plate 3. The idea is to have the cross member placed at as great a distance as possible above the clevis 4. The side members and bolt holes 32 and 33 which register with the holes 18 and 19 in the winch casing, afford means for bolting the frame 28 in place. The cross member 31 has a pivot pin hole 34 offset as much to the right of the medial longitudinal line of same frame as the bracket portion 17 of the winch casing is inset toward the medial longitudinal vertical plane of the tractor, so as to bring the axis of said pivot pin hole in the middle of the tractor at the rear. The frame members 29 and 30 are parallel as regards those portions which coincide with the under parts of the winch casing, but the member 29 near its outer end converges toward the member 30 for the dual purpose of shortening and thereby strengthening the cross member 31, and in order to narrow the outer end of the frame so that it will go between the ends of the plow beams when the plow is lifted. The member 30 has an arcuate recess 35 in its upper edge, permitting it to fit beneath a bulge of the gear housing 11. Diagonal cross braces 36 and 37, provided in the interest of rigidity, bridge the space between the side frame members 29 and 30, and are welded to said members. Some of the structural details of the frame are prescribed only with respect to the particular winch selected for purpose of illustrating the invention, and are unimportant in the broad contemplation of the invention.

The coupling per se is a massive member 38, having a vertical bore 39 through its forward end, and a horizontal bore 40 through its rearward end 48, said bores being perferably bushed and fitting the respective pivot pins 41 and 42. The overall length of the vertical bore is the distance from the under face of the cross member 31 to the upper face of the lower eye 7 of the clevis. The forward end of the coupling has an intermediate horizontal slot 43 of such width in a vertical direction as to receive the upper bifurcation of the clevis 4 with small tolerance. Said slot intersects the vertical bore 39, dividing the forward end of the coupling into an upper portion 44 which closely fits between the cross member 31 and the upper eye of the clevis, and a lower portion 45 closely fitting between the bifurcation of the clevis.

The overall length of the horizontal bore 40 is the distance between the eyes 26 and 27 of the plow beams, so that the rearward end of the coupling fits neatly between the sides of the plow beams.

The fact that the cross member is spaced a considerable distance above the clevis, and that the vertical pivot pin is closely embraced by the coupling, both above and within the clevis, not only completely immobilizes the clevis in its longitudinal position, but resists any lateral tilting force against the vertical pivot pin transmitted from the plow to the coupling through the horizontal pivot pin. Thus, both yawing and lateral tilting of the plow is suppressed.

While I have in the above description disclosed what has been found to be an efficient and practical embodiment of the invention, it will be understood by those skilled in the art that the specific details of construction and arrangement of parts, as shown and described, are by way of illustration and not to be construed as restricting the scope of the invention.

What I claim is:

1. In ditch making apparatus including a tractor having a fixed transverse drawbar plate with a clevis having one end vertically pivoted thereto, and vertically bifurcated at its opposite end, said clevis having vertically aligned holes in the bifurcations for a pivot pin, and a plow drawn by said tractor having spaced parallel beams with transversely aligned holes for a pivot pin, a coupling attachment adapted for interposition between said tractor and plow comprising a rigid frame including a transverse member, means for fixedly securing said frame relative to said tractor with said transverse member extending over said clevis in spaced relation thereto, said transverse member having a hole for a pivot pin in axial alignment with the holes in the bifurcations of said clevis when the latter is perpendicular to said drawbar plate, an integral coupling having forward portions respectively closely fitting between said transverse member and the upper of said bifurcations and between said bifurcations, said portions having vertical bores therethrough coaxial with the holes in said transverse member and bifurcations, a pivot pin passing through and closely fitting said holes and bore, said coupling having a portion adapted to closely fit between said plow beams and having a horizontal bore therethrough adapted to be aligned with the pivot pin holes in said plow beams, and a pivot pin fitting said longitudinal bore and the holes in said side members adapted to be inserted through said holes and bore for connecting said plow to said coupling.

2. In ditch making apparatus including a winch equipped tractor having a fixed transverse drawbar plate below the winch with a clevis having one end vertically pivoted thereto, and vertically bifurcated at its opposite end, said clevis having vertically aligned holes in the bifurcations for a pivot pin, the winch including a casing having spaced standards bolted to said drawbar plate, and housings inwardly offset from said standards above the level of said drawbar plate, the inner sides of said standards below said housings being parallel and provided each with longitudinally spaced bolt holes, and a plow drawn by said tractor having a cable between said winch and plow for lifting said plow and having a beam with a horizontal eye in its forward end, a coupling attachment comprising a rigid frame having parallel side members spaced to fit against the inner sides of said standards and a transverse member fixed upon the tops of said side members at their outer ends, said side members having bolt holes positioned to register with the bolt holes through said standards when said frame is positioned between said standards, means for bolting said frame to said standards through said registering bolt holes, the length and depth dimensions of said side members being such as to space said transverse member over said clevis, said transverse member having a pivot pin hole therethrough in axial alignment with the holes in said bifurcations when said frame is bolted in place, an integral coupling having forward portions respectively closely fitting between said transverse member and the upper of said bifurcations and between said bifurcations, said portions having vertical bores therethrough coaxial with the holes in said transverse member and bifurcations, a pivot pin passing through said holes and bore, said coupling including a rearward portion having a horizontal bore and a pivot pin passing through said longitudinal bore and the eye in said plow beam for connecting said plow to said coupling.

3. In ditch making apparatus including a winch equipped tractor having a fixed transverse drawbar plate below the winch with a clevis having one end vertically pivoted thereto, and vertically bifurcated at its opposite end, said clevis having vertically aligned holes in the bifurcations for a pivot pin, the winch having a casing including spaced standards bolted to said drawbar plate and housings inwardly offset from said standards above the level of said drawbar, the inner sides of said standards below said housings being parallel and provided each with longitudinally spaced bolt holes, and a plow drawn by said tractor having a cable between said winch and plow for lifting said plow, said plow having spaced parallel beams with transversely aligned bolt holes for a pivot pin, a coupling attachment comprising a rigid frame having parallel side members spaced to fit against the inner sides of said standards and a transverse member fixed upon the tops of said side members at their outer ends, said side members having bolt holes positioned to register with the bolt holes through said standards when said frame is positioned between said standards, means for bolting said frame to said standards through said registering bolt holes, the length and depth dimensions of said side members being such as to space said transverse member over said clevis, said transverse member having a pivot pin hole therethrough in axial alignment with the holes in said bifurcations when said clevis is perpendicular to said drawbar plate, an integral coupling having forward portions respectively closely fitting between said transverse member and the upper of said bifurcations, and between said bifurcations, said portions having a vertical bore therethrough coaxial with the holes in said transverse member and bifurcations, a pivot pin passing through and closely fitting said holes and bore, said coupling having its rear end adapted to closely fit between said plow beams and having a horizontal bore therethrough adapted to align with the pivot pin holes in said plow beams, and a pivot pin fitting said longitudinal bore and the holes in said side members adapted to be inserted therethrough for connecting said plow to said coupling.

4. In ditch making apparatus including a winch equipped tractor having a fixed transverse drawbar plate below the winch with a clevis having one end vertically pivoted thereto, and vertically bifurcated at its opposite end, said clevis having vertically aligned holes in the bifurcations for a pivot pin, the winch having a casing including spaced standards bolted to said drawbar plate and housings inwardly offset from said standards above the level of said drawbar plate, the inner sides of said standards below said housings being parallel and provided each with longitudinally spaced bolt holes, and a plow drawn by said tractor having a cable between said winch and plow for lifting said plow, said plow having spaced parallel beams with transversely aligned bolt holes for a pivot pin, a coupling attachment comprising a rigid frame having parallel side members spaced to fit against the inner sides of said standards and a transverse member fixed upon the tops of said side members at their outer ends, said side members having bolt holes positioned to register with the bolt holes through said standards when said frame is positioned between said standards, means for bolting said frame to said standards through said registering bolt holes, the length and depth dimensions of said side members being such as to space said transverse member over said clevis, said transverse member having a pivot pin hole therethrough in axial alignment with the holes in said bifurcations when said frame is in place, an integral coupling having a forward end of such height as to fit closely between said transverse member and the lower of said bifurcations having a vertical bore therethrough and having a horizontal slot intersecting said vertical bore intermediately, of a width to closely receive the upper of said bifuriations, a pivot pin passing through said bore and the holes in said transverse member and bifurcations, said coupling having a rearward end of such width as to fit closely between the plow beams, having a horizontal bore therethrough adapted to align with the pivot pin holes in said beams, and a pivot pin passing through and fitting said horizontal bore and the holes in said side members for connecting said plow to said coupling.

WARREN K. SETTLEMIRE.

References Cited in the file of this patent

UNITED STATES PATENTS

| Number | Name | Date |
|---|---|---|
| 500,873 | Eldredge | July 4, 1893 |
| 1,006,440 | Curtis | Oct. 17, 1911 |
| 2,341,807 | Olmstead et al. | Feb. 15, 1944 |